(12) United States Patent
Xie et al.

(10) Patent No.: US 7,778,215 B2
(45) Date of Patent: Aug. 17, 2010

(54) DIGITAL TRUNKED COMMUNICATION NETWORK WHICH SUPPORTS ROAMING AND METHOD THEREOF

(75) Inventors: Guosheng Xie, Guangdong Province (CN); Gang Ren, Guangdong Province (CN); Qiang Wu, Guangdong Province (CN)

(73) Assignee: ZTE Corporation, Guangdong (CN)

( * ) Notice: Subject to any disclaimer, the term of this patent is extended or adjusted under 35 U.S.C. 154(b) by 397 days.

(21) Appl. No.: 11/571,737

(22) PCT Filed: Jul. 6, 2004

(86) PCT No.: PCT/CN2004/000760

§ 371 (c)(1),
(2), (4) Date: Jan. 5, 2007

(87) PCT Pub. No.: WO2006/002576

PCT Pub. Date: Jan. 12, 2006

(65) Prior Publication Data

US 2008/0084839 A1 Apr. 10, 2008

(51) Int. Cl.
*H04W 4/00* (2009.01)
(52) U.S. Cl. .......... 370/327; 370/240; 455/432.1; 455/520; 455/519
(58) Field of Classification Search .......... 370/327, 370/340; 455/432.1, 433, 435.1, 520
See application file for complete search history.

(56) References Cited

U.S. PATENT DOCUMENTS 5,475,683 A * 12/1995 Harrison et al. ............ 370/332
6,640,109 B1 * 10/2003 Drozt et al. ................ 455/508
6,882,856 B1 * 4/2005 Alterman et al. ........... 455/519
7,389,120 B2 * 6/2008 Zufall ........................ 455/519
7,453,837 B2 * 11/2008 Jiang et al. ................. 370/320
2003/0153339 A1 * 8/2003 Crockett et al. ............ 455/518

FOREIGN PATENT DOCUMENTS

| CA | 1282462 | 4/1991 |
|---|---|---|
| CN | 1138279 | 2/2004 |
| WO | WO-9105429 | 4/1991 |

* cited by examiner

Primary Examiner—Kent Chang
Assistant Examiner—Magdi Elhag
(74) Attorney, Agent, or Firm—IP Strategy Group, P.C

(57) ABSTRACT

A digital trunked communication network which supports roaming, includes a plurality of trunked communication systems, each of which comprises a base station subsystem and a dispatching subsystem; wherein base station subsystem is used to access various services of a terminal, and to forward trunked service to dispatching subsystem; dispatching subsystem is used to control and manage the trunked service of terminal which locates in its service area, and dispatching subsystems are connected together by IP network. The present invention divides the single control center of existing system into several independent subsystems by employing modularized network organization, thereby making the design and realization of various services clearer and more independent and effectively reducing the complexity of the system and coupling among various services. In addition, the present invention also provides a trunked roaming method which takes the home trunked system as control point in calling layer, thereby ensuring that the system consistently process roaming, non-roaming calls.

24 Claims, 7 Drawing Sheets

DIGITAL TRUNKED COMMUNICATION NETWORK WHICH SUPPORTS ROAMING AND METHOD THEREOF

PRIORITY CLAIM

This application is related to and claims priority to a commonly assigned International PCT Application, Serial No. PCT/CN2004/000760, filed Jul. 6, 2004, which is incorporated by reference herein.

FIELD OF THE INVENTION

The present invention relates to trunked communication technology in the field of mobile communication, particularly to a digital trunked communication network which supports roaming and a method for realizing roaming.

DESCRIPTION OF PRIOR ART

Trunked communication is an important branch of mobile communication, while supporting roaming is a necessary function for a trunked communication system, which directly decides whether the trunked communication system can provide a whole network coverage service or not. A trunked service has unique characteristics such as one-to-many call, late-joining and dynamic regroup, while the roaming technology for existing mobile communication system is mainly directed to telephone interconnection service etc., so the roaming technology for the existing mobile communication system cannot be completely used in the trunked communication system. It's of particular importance to develop a roaming technology which is suitable for the trunked communication system technology.

The existing technologies for realizing trunked communication system roaming are as follows.

Chinese patent publication No. 1138279, entitled "COMMUNICATION METHOD AND SYSTEM FOR A CELLULAR TRUNKED COMMUNICATION SYSTEM BASED ON SPC SWITCH", controls various services, such as telephone interconnection service, trunked service via the use of a control center, and also provides a method for controlling roaming subscriber in subscriber layer. However, in the technical solution, the control center becomes a bottleneck for various services due to high coupling of various services. Moreover, the solution only illustrates the control flow for a single roaming subscriber, while dispatch call involves a plurality of subscribers, and the solution fails to provide a complete roaming control method in calling layer, including control method for a calling/called side.

Patent No. CA1282462, entitled "TRUNKED COMMUNICATION SYSTEM WITH NATIONWIDE ROAMING CAPABILITY" provides a trunked communication system which supports roaming. The roaming is realized through a central control node, and meanwhile, a terminal needs to identify whether the current state is a roaming state or not in order to make corresponding processing. It is known from the above description that in the patent, the connection range of the central control node limits the range of the whole network roaming and becomes a bottleneck for service processing. Once the central control node breaks down, roaming services of the whole network will be disabled. Moreover, the patent needs that the terminal conducts special processing with respect to the roaming, thereby increasing the complexity of roaming mechanism.

Patent application publication No. WO9105429, entitled "TRUNKED NETWORK WITH AUTOMATIC ROAMING WITHOUT CENTRALIZED CONTROL", provides a trunked communication network for realizing automatic roaming without centralized control. The network consists of a number of trunked systems. Each trunked system has function entities such as control center and local computer (gateway). The roaming is realized through cooperative control of the control center and the local computer (gateway) of each trunked system. The technical solution needs a number of control centers and gateways to participate in the control simultaneously, and the flow for realizing the roaming is complex. Moreover, in the invention, a dispatch call involves a number of subscribers, while the patent application only provides a control method for single roaming subscriber in subscriber layer, and it fails to provide a complete control method in the call layer, including control method for a calling/called side, and cooperative operating method for each system etc.

SUMMARY OF THE INVENTION

The technical problem the present invention aims to solve is to provide a digital trunked communication network which supports roaming and a roaming method, thereby realizing the roaming of a trunked service, overcoming the shortcomings in prior art such as complexity of the system and lack of roaming control in call layer, and ensuring that all kinds of services for the roaming subscriber are carried out smoothly.

The digital trunked communication network which supports roaming of the present invention at least included two trunked communication systems. Each of the trunked communication systems includes a base station subsystem and a dispatching subsystem; wherein the base station subsystem is used to access various services of a terminal and to forward a trunked service to the dispatching subsystem; the dispatching subsystem is used to control and manage the trunked service of the terminals in a service area thereof, and dispatching subsystems are connected together by an IP network. The dispatching subsystem has a dispatching server, a dispatching home register, and a trunked gateway. The dispatching server is used to perform the call control and the talk floor management of a dispatch call and is connected with the dispatching home register and the trunked gateway respectively. The dispatching home register is used to store the registration information and the location information of a trunked subscriber and group. The trunked gateway is used to connect an external IP network.

Furthermore, the digital trunked communication system further includes a exchange subsystem and/or a packet data subsystem and/or a short message subsystem and/or an intelligent network subsystem and/or a positioning subsystem so as to achieve other services of the terminal.

The roaming method for the digital trunked communication network of the present invention includes: a procedure for the registration of a roaming subscriber, a procedure for originating a dispatch call by the roaming subscriber, a procedure for the roaming subscriber to respond to the dispatch call, and a procedure for the roaming subscriber to late-join in the dispatch call.

The procedure for the registration of a roaming subscriber includes the following: the roaming subscriber originates a registration request for a trunked service, a visited dispatching subsystem conducts routing according to the subscriber identification code information, forwards the request to a home dispatching subsystem via an IP network, and records the latest registration information of the roaming subscriber.

In one or more embodiments, the procedure for the roaming subscriber to late-join in the dispatch call includes the following: the dispatch call has been established; the roaming subscriber conducts registration operation; the visited dispatching subsystem forwards a registration message to the home dispatching subsystem; the home dispatching subsystem forwards the dispatch call connection request of the roaming subscriber to the visited base station subsystem in case the home dispatching subsystem determines the dispatch call has been established while the roaming subscriber has not joined the call; when the call of the roaming subscriber is established, the home dispatching subsystem receives the call establishment completion notification; and the home dispatching subsystem adds the roaming subscriber to the dispatch call.

In one or more embodiments, the procedure for the roaming subscriber to late-join in the dispatch call includes the following: the dispatch call has been established; the roaming subscriber originates the dispatch call actively; the visited dispatching subsystem forwards the call request to the home dispatching subsystem; after receiving the call request, the home dispatching subsystem forwards the dispatch call connection request of the roaming subscriber to the visited base station subsystem in case the home dispatching subsystem determines the dispatch call has been established while the roaming subscriber has not join the call; when the call of the roaming subscriber is established, the home dispatching subsystem receives the call establishment completion notification; and the home dispatching subsystem adds the roaming subscriber to the dispatch call.

In one or more embodiments, the procedure for the roaming subscriber to late-join in the dispatch call includes the following: the dispatch call has been established; the home dispatching subsystem determines actively sends the trunked connection request to the roaming subscriber who has not join the call; the home dispatching subsystem forwards the dispatch call connection request of the roaming subscriber to the visited base station subsystem in case the home dispatching subsystem determines the dispatch call has been established while the roaming subscriber has not join the call; when the call of the roaming subscriber is established, the home dispatching subsystem receives the call establishment completion notification; and the home dispatching subsystem adds the roaming subscriber to the dispatch call.

The procedure for the roaming subscriber to late-join in the dispatch call includes the following: the dispatch call has been established; the roaming subscriber originates the dispatch call actively; the visited dispatching subsystem forwards the call request to the home dispatching subsystem; after receiving the call request, the home dispatching subsystem forwards the dispatch call connection request of the roaming subscriber to the visited base station subsystem in case the home dispatching subsystem determines the dispatch call has been established while the roaming subscriber has not join the call; when the call of the roaming subscriber is established, the home dispatching subsystem receives the call establishment completion notification; and the home dispatching subsystem adds the roaming subscriber to the dispatch call.

The procedure for the roaming subscriber to late-join in the dispatch call includes the following: the dispatch call has been established; the home dispatching subsystem actively sends the trunked connection request to the roaming subscriber who has not join the call; the home dispatching subsystem forwards the dispatch call connection request of the roaming subscriber to the visited base station subsystem in case the home dispatching subsystem determines the dispatch call has been established while the roaming subscriber has not join the call; when the call of the roaming subscriber is established, the home dispatching subsystem receives the call establishment completion notification; and the home dispatching subsystem adds the roaming subscriber to the dispatch call.

The trunked communication system of the present invention employs a modular network organization and divides the single control center of an existing system into several independent subsystems according to the services, thereby making the design and realization of various services such as telephone interconnection service, package data service and trunked service clearer and more independent, and moreover, the deployment and development of various services becomes more flexible and independent, thereby effectively reducing the complexity of the system and the coupling among various services. The present invention uses a peer-to-peer node roaming network architecture without the participation and control of the central control node; the roaming of the trunked service is connected with an external IP network via the trunked gateway, and trunked signaling and data stream transmission are realized by way of the powerful routing capability of the IP network. Each trunked gateway is peer to each other logically such that the topology of the system becomes more flexible, the flow becomes more convenient, the roaming coverage area becomes wider, and the fault-tolerant capability of the system becomes better. The present invention uses NGN network to carry out the interconnection and mutual roaming of the trunked systems in the range of the whole network. The NGN network supports all kinds of access technologies well and has good service extending capability. Roaming within the same kind of trunked system can be realized and roaming among different trunked systems can be supported by using the NGN network, and meanwhile, the subsequent service extension of the trunked system is provided with wider room.

The present invention provides a trunked roaming method which takes the home trunked system as the call control point in the call layer, and it can ensure that the system processes the roaming, non-roaming call consistently, and the call is under a monitoring state of the system all the time, thereby enhancing the management capability of the system. The present invention simplifies the control strategy of the system to the roaming subscriber, and the dispatching subsystem is in the position to control the trunked service of the roaming subscriber and the non-roaming subscriber without the participation of other function entities in the control, thereby reducing the complexity of the service flow. Moreover, the present invention simplifies the realization of the roaming of a terminal, making the roaming realization need no special processing by the terminal with respect to the roaming, that is, the roaming is transparent for the terminal, thereby simplifying the roaming mechanism on a large scale. Since the present invention includes methods for the registration of the roaming subscriber, for the roaming subscriber to originate the call, for the roaming subscriber to be called, and for the roaming subscriber to late-join in the call, the effect of realizing subscriber roaming within the coverage of the trunked system network is achieved.

DETAILED DESCRIPTION OF THE PRESENT INVENTION

Now the technical solution of the present invention will be further describe in detail in combination with the drawings and embodiments thereof.

Figure 1:
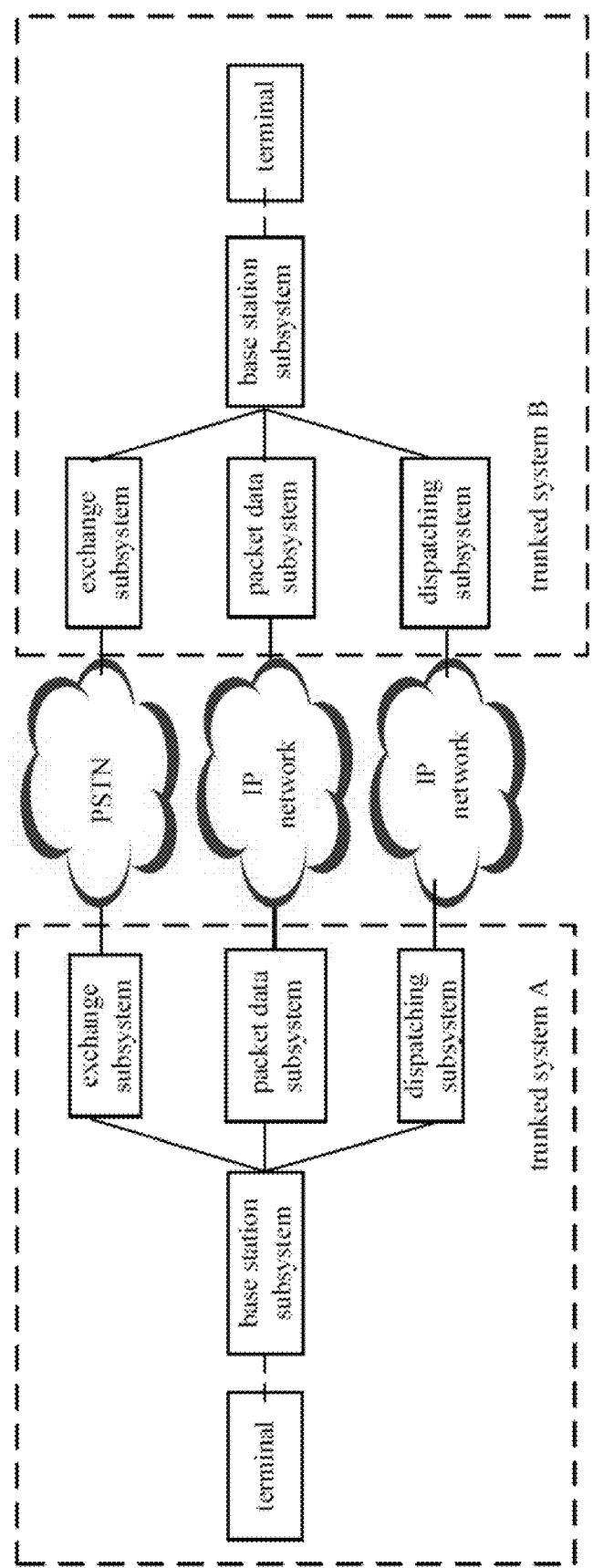
FIG. 1 is a network architecture view of a digital trunked communication network of the present invention.

An architectural schematic view of a trunked communication network as shown in FIG. 1 at least includes two trunked communication systems, and each trunked system has a base station subsystem, a dispatching subsystem, a packet data subsystem, an exchange subsystem, and a terminal. The terminal is accessed to the exchange subsystem, the packet data subsystem and the dispatching subsystem respectively via the base station subsystem. The exchange subsystems in different trunked systems are interconnected via a PSTN network, the packet data subsystems in different trunked systems are interconnected via an IP network, and the dispatching subsystems in different trunked systems are interconnected via the IP network.

Wherein the terminal is a terminal equipment which has trunked service function as well as several capabilities such as telephone interconnection service, package data service, and short message service, and the terminal can roam within the whole network coverage. The base station subsystem is used to perform the access function of the terminal, and dispatch to corresponding subsystem for processing according to the service type used by the subscriber. The dispatching subsystem, mainly used to control and manage the trunked service of the terminal in the service area thereof, is the control center of the trunked service. The exchange subsystem, mainly used to control and exchange the telephone interconnection service of the terminal in the service area thereof, is the control center of the telephone interconnection service. The packet data subsystem, mainly used to control and access the package data service of the terminal in the service area thereof, is the control center of the package data service. Based on the above basic subsystems, the trunked communication system of the present invention can further include subsystems such as short message subsystem, intelligent network subsystem, positioning subsystem in order to provide more services.

In the above mentioned trunked system, each kind of service (such as the telephone interconnection service, the trunked service, and the package data service) has a corresponding subsystem (such as the exchange subsystem, the dispatching subsystem, the packet data subsystem) for control processing. The interconnection networks among corresponding subsystems provide load for the roaming support of each kind of service. The interconnection networks between the subsystems constitute a trunked system network of the whole network range together with the trunked systems in respective area so as to provide the subscriber with roaming support for all kinds of services in the whole network range.

Figure 2:
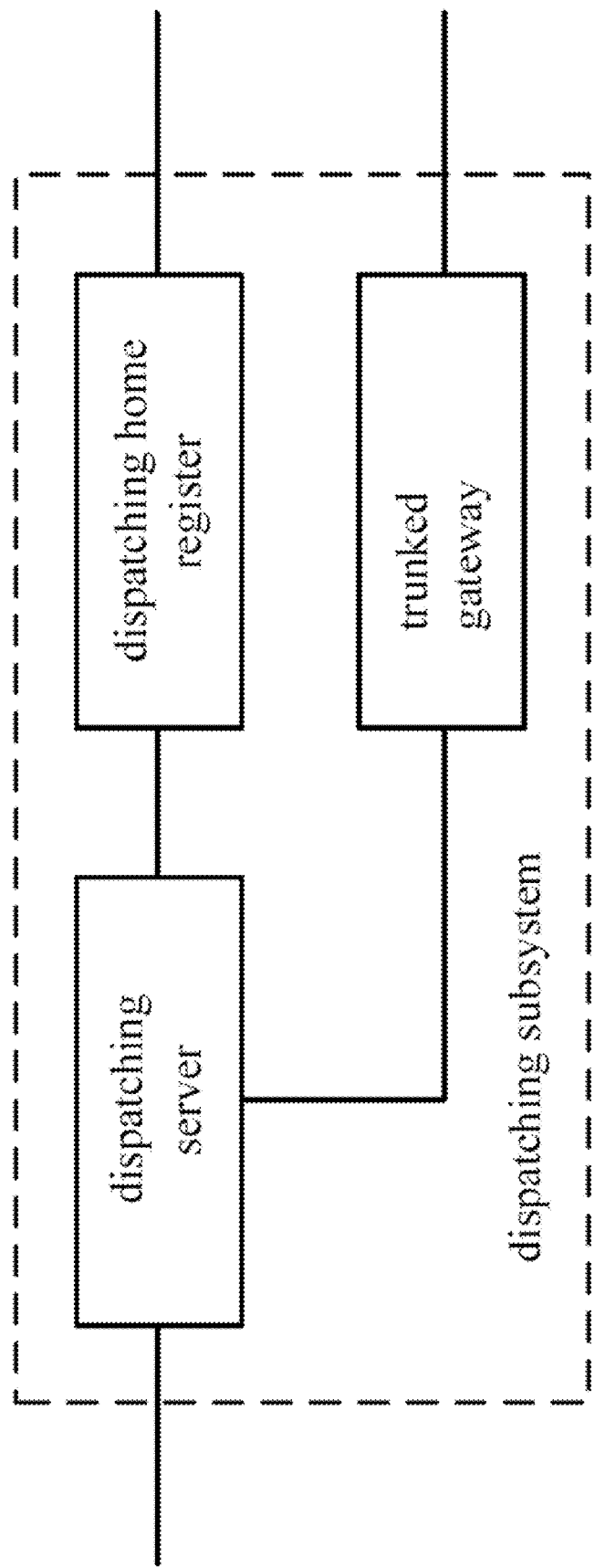
FIG. 2 is a architecture view of the structure of a dispatching subsystem in FIG. 1.

FIG. 2 shows an architecture view of the dispatching subsystem, including: a dispatching server, a dispatching home register, and a trunked gateway. Wherein the dispatching server is used to realize the call control and the talk floor management of the dispatch call and is connected with the dispatching home register and the trunked gateway respectively. The dispatching home register is used to store the registration information and the location information of the trunked subscriber and group in order to realize the functions of authentication, authorization, and location renewal and group management to the trunked subscriber. The trunked gateway is connected with an external IP network for realizing the interconnection of local trunked system with other trunked systems.

Figure 3:
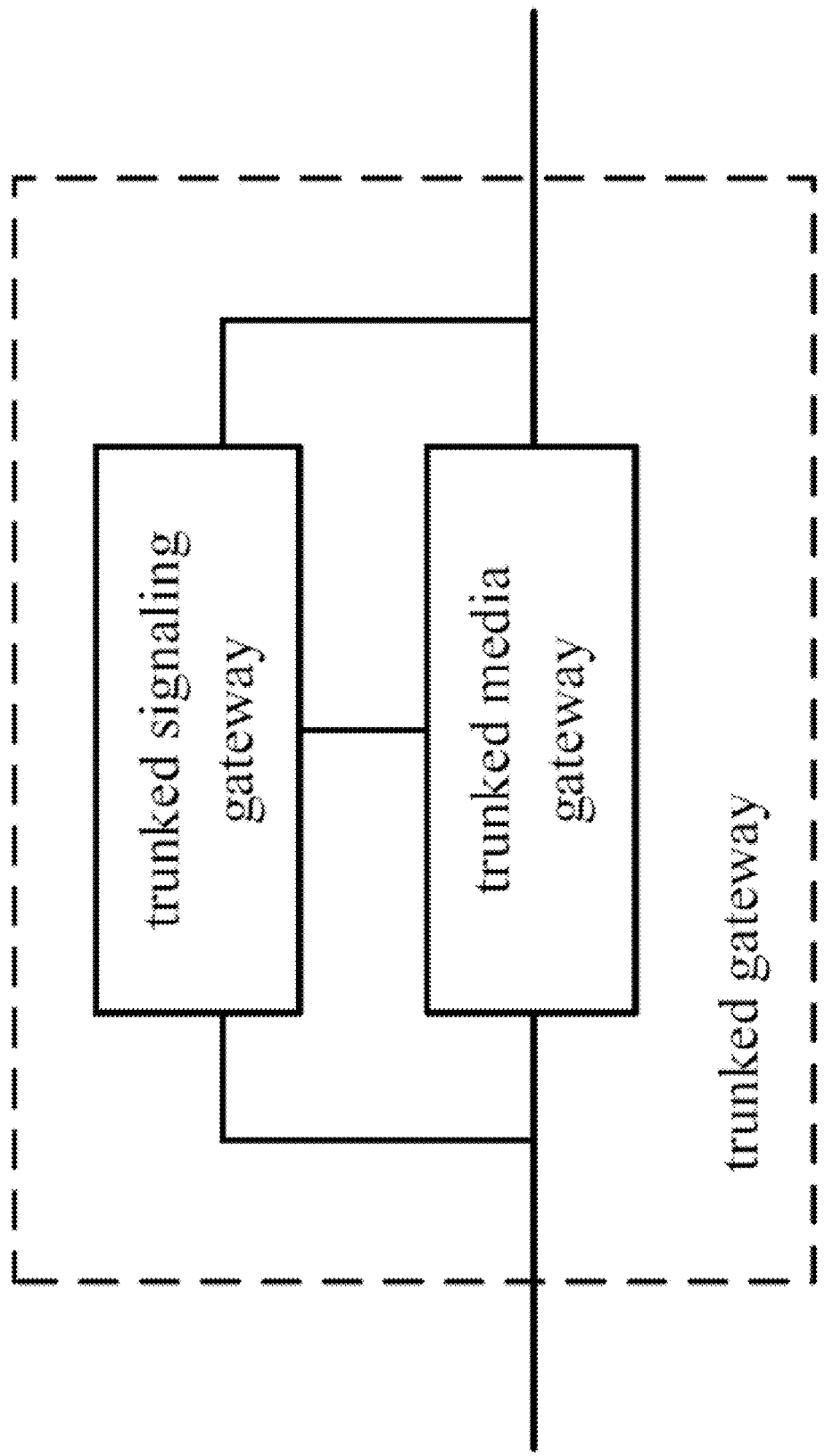
FIG. 3 is an architecture view of a trunked gateway in FIG. 2.

The trunked gateway in the dispatching subsystem is shown in FIG. 3. The trunked gateway is divided into a trunked signaling gateway and a trunked media gateway logically, wherein the trunked signaling gateway is responsible for the interaction and conversion of a signaling, and is responsibe for controlling the trunked media gateway. The trunked media gateway is responsible for the conversion and transmission of a media stream.

The peripheral interface of the trunked gateway employs two ways. One is to use a format consistent with the inner signaling and media stream of the trunked system, and this way is suitable for roaming in the trunked system itself. The second one is to used a SIP/RTP interface in an NGN network, and this way is suitable for roaming both in the trunked system itself and in several trunked systems.

For a subscriber or a group, there exists the concepts of a home trunked communication system and a visited trunked communication system, wherein the home trunked communication system is the system where the registration information for account application of the subscriber or group locates, and the visited trunked communication system is the system of the visited where the subscriber or group currently locates.

If the dispatching home register in the visited trunked communication system and the dispatching home register in the home trunked communication system cannot communicate with each other directly, messages will be forwarded via the agent of the dispatching home register of an intermediate trunked communication system.

If the trunked gateway in the visited trunked communication system and the trunked gateway in the home trunked communication system cannot communicate with each other directly, messages will be forwarded by the agent of the trunked gateway of the intermediate trunked communication system.

The roaming method of the trunked communication network described in the present invention is mainly directed to the roaming support for the subscriber's trunked service. The trunked service roaming is mainly realized by the control of the dispatching subsystem. The local trunked system connects the IP network via the trunked gateway of the dispatching subsystem, thereby realizing the interconnections with the trunked systems in other areas.

In combination with other subsystems in the trunked system, the roaming support provided by the trunked communication network of the present invention can realize the roaming support for all kinds of services for the subscriber, including the telephone interconnection service, the package data service, and the short message service. While the roaming support for the services obeys relative regulations of the current mobile communication system, which is omitted herein.

The roaming method for the digital trunked communication network includes: a procedure for the registration of a roaming subscriber, a procedure for originating a dispatch call by the roaming subscriber, a procedure for the roaming subscriber to respond to the dispatch call, and a procedure for the roaming subscriber to late-join in the dispatch call. Now the above mentioned procedures will be illustrated in detail with reference to FIG. 4 through 7.

The subscriber of the trunked communication system of the present invention is allocated with a unique identification code to carry the information of the area where the subscriber locates, and the identification code is also the basis for the subscriber message to conduct routing. Due to the use of the subscriber identification code, it's not necessary for the roaming terminal to conduct any particular processing which is relative to the roaming, and the roaming support is performed by the interactive cooperation of the system side equipments, thereby simplifying the roaming realization of the terminal and the roaming mechanism.

When the roaming subscriber is trunked subscriber, main procedures for the registration of the roaming subscriber are as follows: the roaming subscriber originates a peculiar registration of the trunked service, the visited dispatching subsystem conducts routing according to the subscriber identification code information, then transmits the request to the home dispatching subsystem, and records the lastest registration location information of the trunked subscriber.

Figure 4:
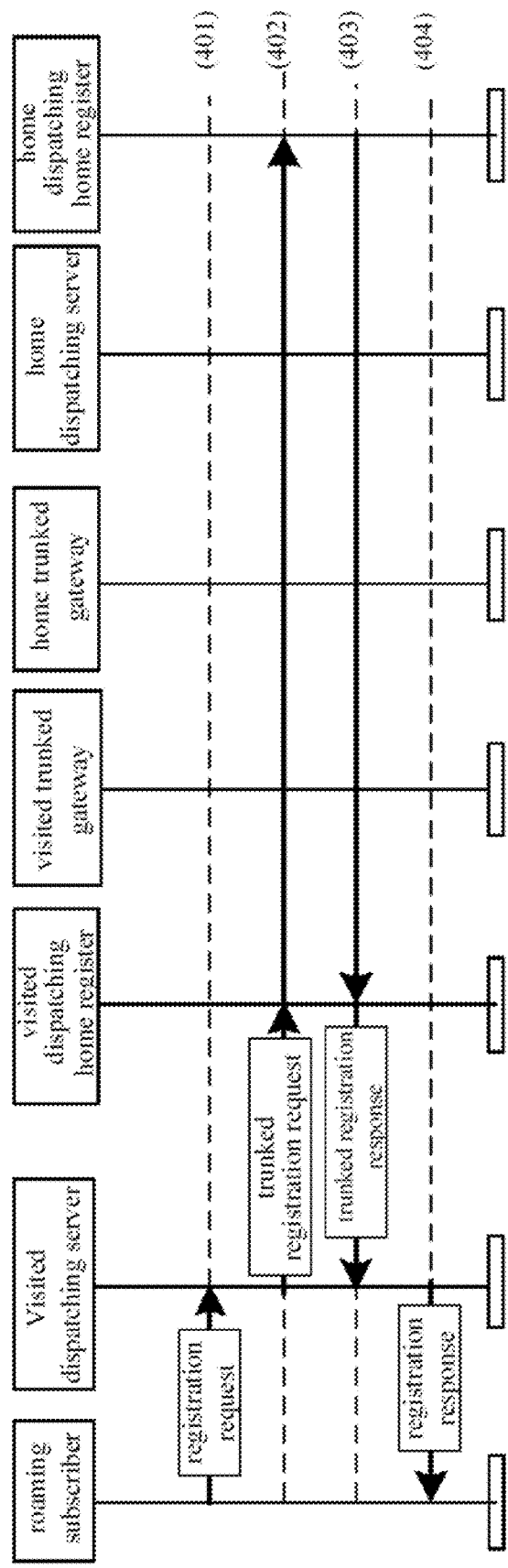
FIG. 4 is a flow view illustrating the registration of a roaming subscriber in the method of the present invention.

FIG. 4 is a detailed flow view illustrating the registration of the roaming subscriber. The roaming subscriber originates the registration request for the trunked service to the visited dispatching server due to reasons such as power-on and timing registration (step 401). The visited dispatching server forwards the registration request to the visited dispatching home register after it receives the request. The visited dispatching home register selects a route according to the subscriber identification code, and forwards the registration request to the home dispatching home register (step 402). The home dispatching home register renews the location of the subscriber according to the trunked registration request, then returns a trunked registration response message to the visited dispatching home register, and the visited dispatching home register then returns the registration response message to the visited dispatching server (step 403). The visited dispatching server returns the registration response message of the trunked service to the roaming subscriber (step 404).

The main steps for originating the dispatch call by the roaming subscriber include the following: the roaming subscriber originates the dispatch call request; the visited dispatching subsystem conducts routing according to the subscriber identification code information, sends authentication request to the home dispatching subsystem, and the home dispatching subsystem authenticates the subscriber. The visited dispatching subsystem receives the authentication response and the authorization information returned by the home dispatching subsystem, determines that the subscriber is in the roaming state, and then forwards the call request to the home dispatching subsystem. The home dispatching subsystem, as the call control point, originates a trunked connection request to each subscriber involved in the call, and if the subscriber is a roaming subscriber (including the calling subscriber), the trunked connection request is forwarded to the visited dispatching subsystems of the respective roaming subscribers. When the subscriber dispatch call is established, if the subscriber is a home subscriber, the home base station subsystem informs the home dispatching subsystem directly that the subscriber dispatch call has been established. If the subscriber is a roaming subscriber, the visited base station subsystem informs the home dispatching subsystem that the subscriber dispatch call has been established via the forwarding of the visited dispatching subsystem. After being informed that the dispatch call has been established, the home dispatching subsystem sends a dispatch call authorization to the calling subscriber via the visited dispatching subsystem and the visited base station subsystem, and the home dispatching subsystem is the control point of the dispatch call and subsequent talk floor management.

In the dispatch call, the transmission path of the forward/reverse voice stream of the roaming subscriber is the visited base station subsystem, the visited dispatching subsystem, and the home dispatching subsystem.

Figure 5:
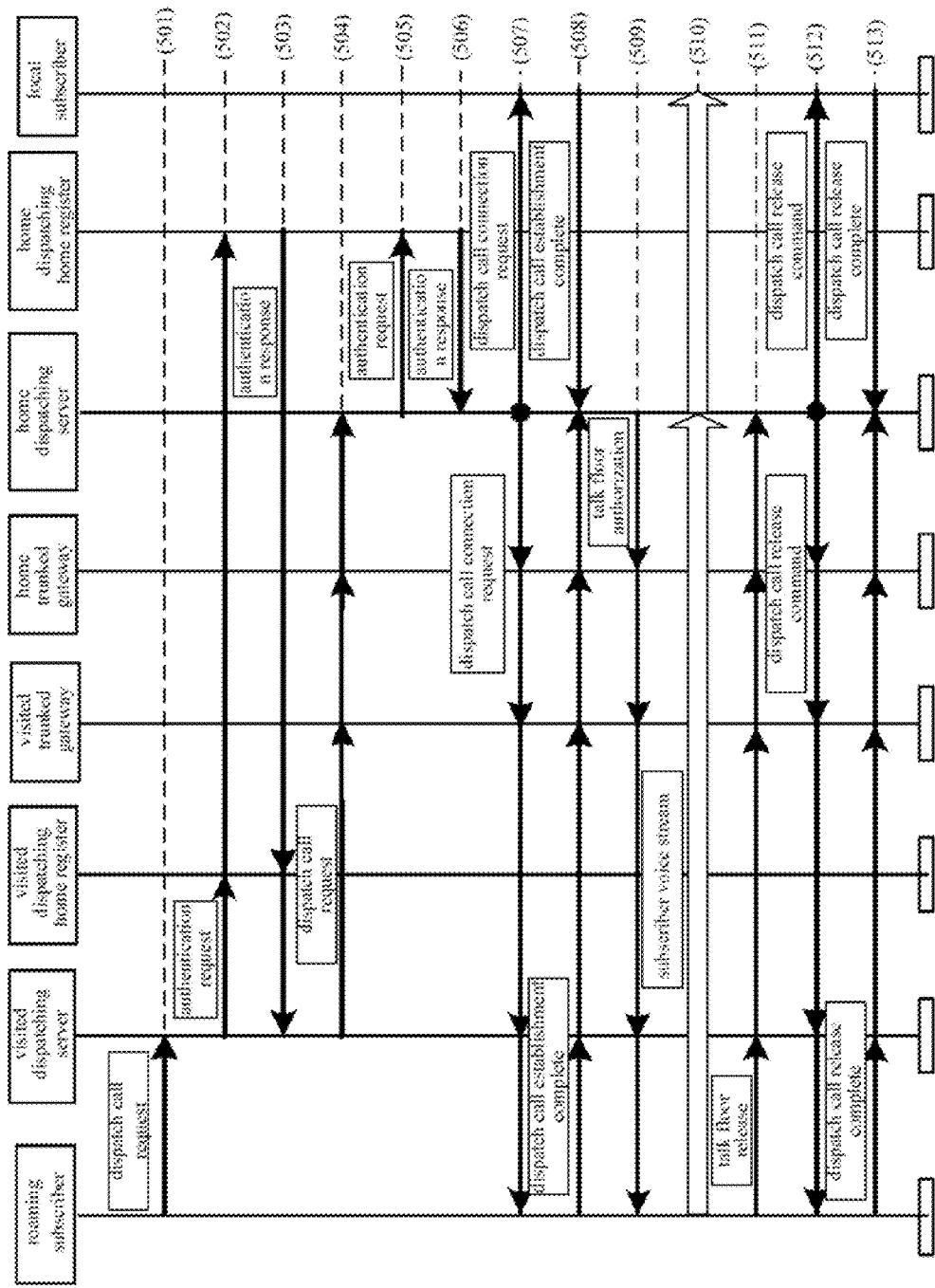
FIG. 5 is a flow view illustrating that the roaming subscriber originates a dispatch call in the method of the present invention.

FIG. 5 shows a detailed flow view illustrating that the roaming subscriber originates the dispatch call. The roaming subscriber originates the dispatch call request (step 501). The visited dispatching server sends the authentication request to the visited dispatching home register after receiving the request. The visited dispatching home register selects route according to the subscriber identification code, and forwards the authentication request to the home dispatching home register (step 502). The home dispatching home register conduct the authenticates and authorizes the subscriber, returns an authentication response to the visited dispatching home register, and the visited dispatching home register returns the authentication response to the visited dispatching server (step 503). The visited dispatching server determines the subscriber is a roaming subscriber after receiving the authentication response, and then forwards the dispatch call request to a visited trunked gateway according to the subscriber's home information returned by the authentication response; the visited trunked gateway translates the received call request message into a form of external signaling, and routes the signaling to a home trunked gateway; the home trunked gateway then translates the external signaling into a dispatch call request message, and forwards the message to the home dispatching server (step 504). The home dispatching server authenticates the call request again after receiving the call request (step 505). The home dispatching home register returns the authentication response to the home dispatching server after authenticating and authorizing the subscriber (step 506). The step 505 and 506 may be omitted. The home dispatching server determines the response after receiving it, and the sends the dispatch call connection request to the home trunked gateway if the subscriber is a roaming subscriber; if the subscriber is a local subscriber, the dispatch call connection request is sent to the local subscriber directly. The home trunked gateway receives the dispatch call connection request, then translates the request into the form of external signaling, routes the signaling to the visited trunked gateway. Then the external signaling is translated into the dispatch call connection request message by the visited trunked gateway, and is forwarded to the visited dispatching server; and the visited dispatching server sends the dispatch call connection request to the roaming subscriber (step 507). The roaming subscriber returns a dispatch call establishment message to the home dispatching server after a channel is established (step 508). The home dispatching server sends a talk floor authorization message to the home trunked gateway after receiving the dispatch call establishment message; the home trunked gateway translates the talk floor authorization message into the form of external signaling, and routes the signaling to the visited trunked gateway; the visited trunked gateway then translates the external signaling into the talk floor authorization message, and forwards the message to the visited dispatching server; the visited dispatching server sends the talk floor authorization message to the roaming subscriber (step 509). The roaming subscriber begins to talk upon a call prompt is received. A voice stream message of the subscriber is sent to the home dispatching server via the visited dispatching server, the visited trunked gateway, and the home trunked gateway, and then the home dispatching server distributes the message to other subscribers of the call according to a call message (step 510). After the roaming subscriber finishes talking, the roaming subscriber sends a talk floor release message to the visited dispatching server, the visited dispatching server forwards the talk floor release message to the visited trunked gateway; the visited trunked gateway translates the message into the form of external signaling, and routes the signaling to the home trunked gateway; the home trunked gateway then translates the external signaling into the talk floor release message, and forwards the message to the home dispatching server; the talk floor enters an idle state (step 511). When a subscriber who has the authority to end the call end the dispatch call, or the idle duration of the dispatch call is time-out, the home dispatching server makes determination. If the subscriber is a roaming subscriber, the home dispatching server sends a dispatch call release command to the home trunked gateway; if the subscriber is a local subscriber, the dispatch call release command is sent to the local subscriber directly. The home trunked gateway, after receiving the message, translates the message into the form of external signaling, routes the external signaling to the visited trunked gateway. The visited trunked gateway then translates the external signaling into the dispatch call release command, and forwards the command to the visited dispatching server, and the visited dispatching server sends the dispatch call release command to the roaming subscriber (step 512). After the call of the subscriber has been released, a dispatch call release completion message is returned to the home dispatching server (step 513).

The main steps for the roaming subscriber to respond to the dispatch call include the following: the calling subscriber originates the dispatch call at home. As the call control point, the home dispatching subsystem originates the trunked connection request to respective subscriber involved in the call according to the location information registered by the subscriber. If the subscriber is a roaming subscriber, the trunked connection request is forwarded to the visited base station subsystem via the home dispatching subsystem and the visited dispatching subsystem. After the call of the roaming subscriber has been established, the visited base station subsystem informs the home dispatching subsystem that the subscriber dispatch call has been established via the forwarding of the visited dispatching subsystem. The home dispatching subsystem sends the dispatch call authorization to the calling subscriber after knowing that the dispatch call has been established. The home dispatching subsystem is the control point of the dispatch call and the subsequent talk floor management; and the transmission path of the forward/reverse voice stream of the roaming subscriber is the visited base station subsystem, the visited dispatching subsystem, and the home dispatching subsystem.

Figure 6:
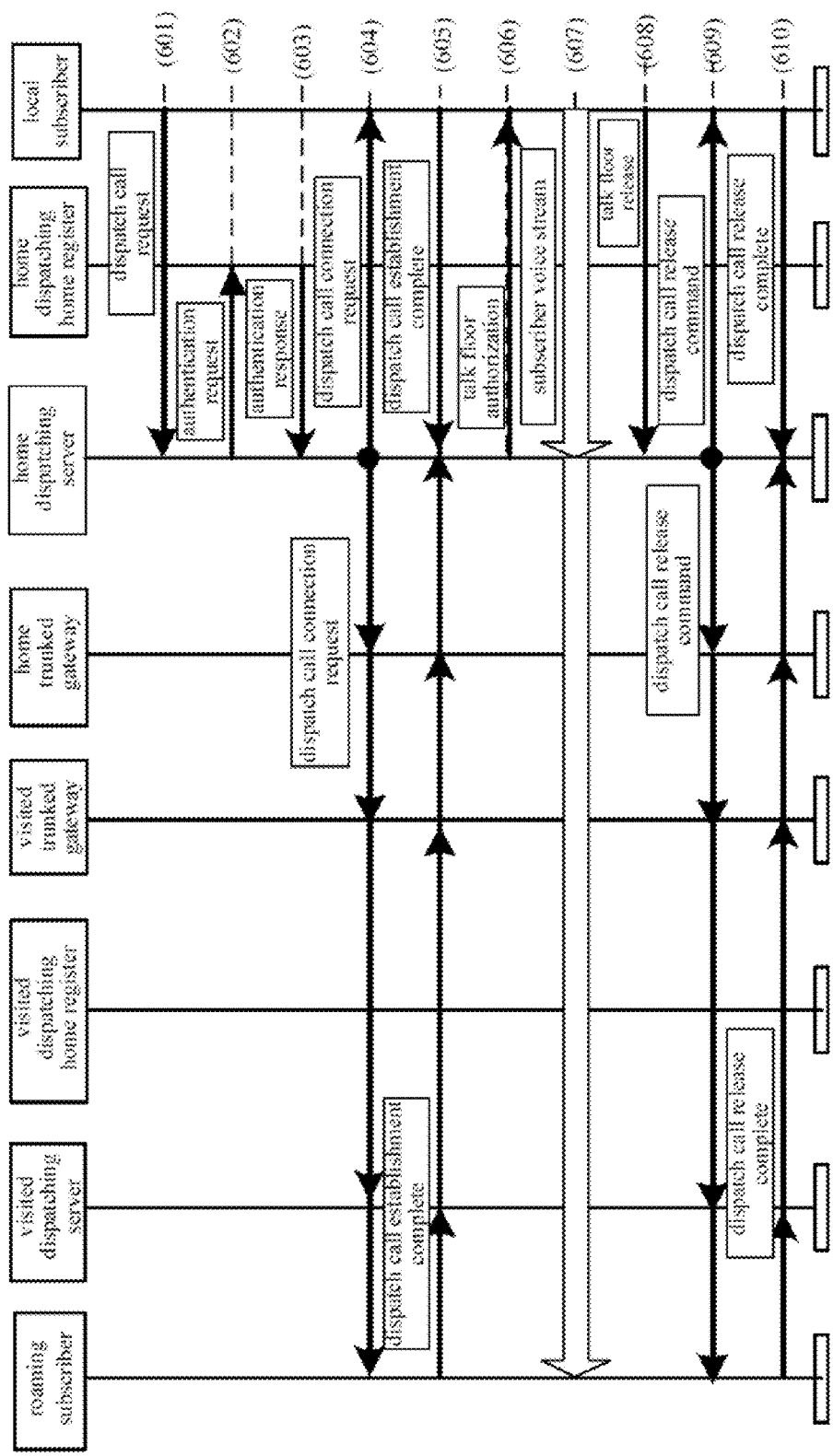
FIG. 6 is a flow view illustrating that the roaming subscriber responds to the dispatch call in the method of the present invention.

FIG. 6 shows the detailed flow for the roaming subscriber to respond to the dispatch call. The local subscriber originates the dispatch call request (step 601). The home dispatching server sends the authentication request to the home dispatching home register after receiving the call request (step 602). The home dispatching home register authenticates and authorized the subscriber, and returns the authentication response message to the home dispatching server (step 603). The home dispatching server makes determination, if the subscriber is a roaming subscriber, the dispatch call connection request is sent to the home trunked gateway; if the subscriber is a local subscriber, the dispatch call connection request is sent to the local subscriber directly. The home trunked gateway translates the request into the form of external signaling after receiving the call connection request, routes the signaling to the visited trunked gateway. The visited trunked gateway then translates the external signaling into the trunked connection request message, and forwards the message to the visited dispatching server, the visited dispatching server sends the trunked connection request to the roaming subscriber (step 604). The roaming subscriber returns the dispatch call establishment message to the home dispatching server after the channel has been established (step 605). The home dispatching server sends the talk floor authorization message to the calling subscriber after knowing that the dispatch call has been established (step 606). The calling subscriber begins to talk upon the call prompt is received, the voice stream message of the subscriber is sent to the home dispatching server; the home dispatching server distributes the message to other subscribers of the call according to the call information. If the subscriber is a roaming subscriber, the message is sent to the roaming subscriber via the home trunked gateway, the visited trunked gateway, and the visited dispatching server (step 607). The calling subscriber sends the talk floor release message to the home dispatching server when finishing the talk, and the talk floor enters the idle state (step 608). When the subscriber who has the authority to end the call ends the dispatch call, or the idle duration of the dispatch call is time-out, the home dispatching server makes determination, and if the subscriber is a roaming subscriber, the dispatch call release command is sent to the home trunked gateway; if the subscriber is a local subscriber, the dispatch call release command is sent to the local subscriber directly. The home trunked gateway translates the command into the form of external signaling after receiving the command, and routes the external signaling to the visited trunked gateway. The visited trunked gateway then translates the external signaling into the dispatch call release command, and forwards the command to the visited dispatching server. The visited dispatching server sends the dispatch call release command to the roaming subscriber (step 609). After the call of the subscriber has been released, the dispatch call release completion message is returned to the home dispatching server (step 610).

The procedure for the roaming subscriber to late-join in the dispatch call is based on the situation that the dispatch call has been established. The requirement of the procedure for triggering the roaming subscriber who has not joined in the call currently to late-join in the dispatch call may be any of the following three requirements: triggering requirement 1: the roaming subscriber conducts registration; triggering requirement 2: the roaming subscriber originates the dispatch call actively; triggering requirement 3: the home dispatching subsystem sends the trunked connection request actively for the sake of dispatching control, for example, a dispatcher adds the subscriber to the call, a group administrator adds the subscriber to the call; or due to scheduled paging.

In the case that the dispatch call has been established, if the triggering requirement is that the roaming subscriber conducts registration, the registration flow of the roaming subscriber as shown in FIG. 4 is followed first. There is an indication which indicates that the dispatch call has been established in the registration response message returned by the home dispatching subsystem. The visited dispatching subsystem determines which activated dispatch call the roaming subscriber belongs to according to the indication which indicates that the dispatch call has been established, then the visited dispatching subsystem conducts routing according to the subscriber identification code, and forwards the registration request message to the home dispatching subsystem. The home dispatching subsystem determines that the roaming subscriber has not joined in the call after receiving the registration request message. Then the home dispatching subsystem forwards the trunked connection request to the visited base station subsystem and establishes the subscriber call via the forwarding of the visited dispatching subsystem and according to the location information registered by the subscriber.

If the triggering requirement is that the roaming subscriber originates the dispatch call actively, the visited dispatching subsystem determines the subscriber is in a roaming state and forwards the call request to the home dispatching subsystem after the home dispatching subsystem is authenticated. The home dispatching subsystem determines the call has been established after receiving the call request, but the subscriber has not joined in the call. Then the home dispatching subsystem forwards the trunked connection request to the visited base station subsystem and establishes the subscriber call via the forwarding of the visited dispatching subsystem and according to the location information registered by the subscriber.

If the triggering requirement is that the home dispatching subsystem sends the trunked connection request actively to the roaming subscriber, the trunked connection request is forwarded to the visited base station subsystem and the subscriber call is established via the forwarding of the visited dispatching subsystem and according to the location information registered by the subscriber. The time for sending the trunked connection request may be once or periodic.

After the roaming subscriber call has been established, the visited base station subsystem informs the home dispatching subsystem that the subscriber dispatch call has been established via the forwarding of the visited dispatching subsystem. The home dispatching subsystem adds the roaming subscriber into the call after knowing that the subscriber dispatch call has been established. If other subscribers are talking in the call at the time, the home dispatching subsystem begins to forward the voice stream to the roaming subscriber. If the call is in a state that nobody talks, and the call which late-joins in the dispatch call triggered by triggering requirement 2, the home dispatching subsystem sends the dispatch call authorization to the calling subscriber via the visited dispatching subsystem and the visited base station subsystem. During the dispatch call, the transmission path of the forward/reverse voice stream of the roaming subscriber is the visited base station subsystem, the visited dispatching subsystem and the home dispatching subsystem.

Figure 7:
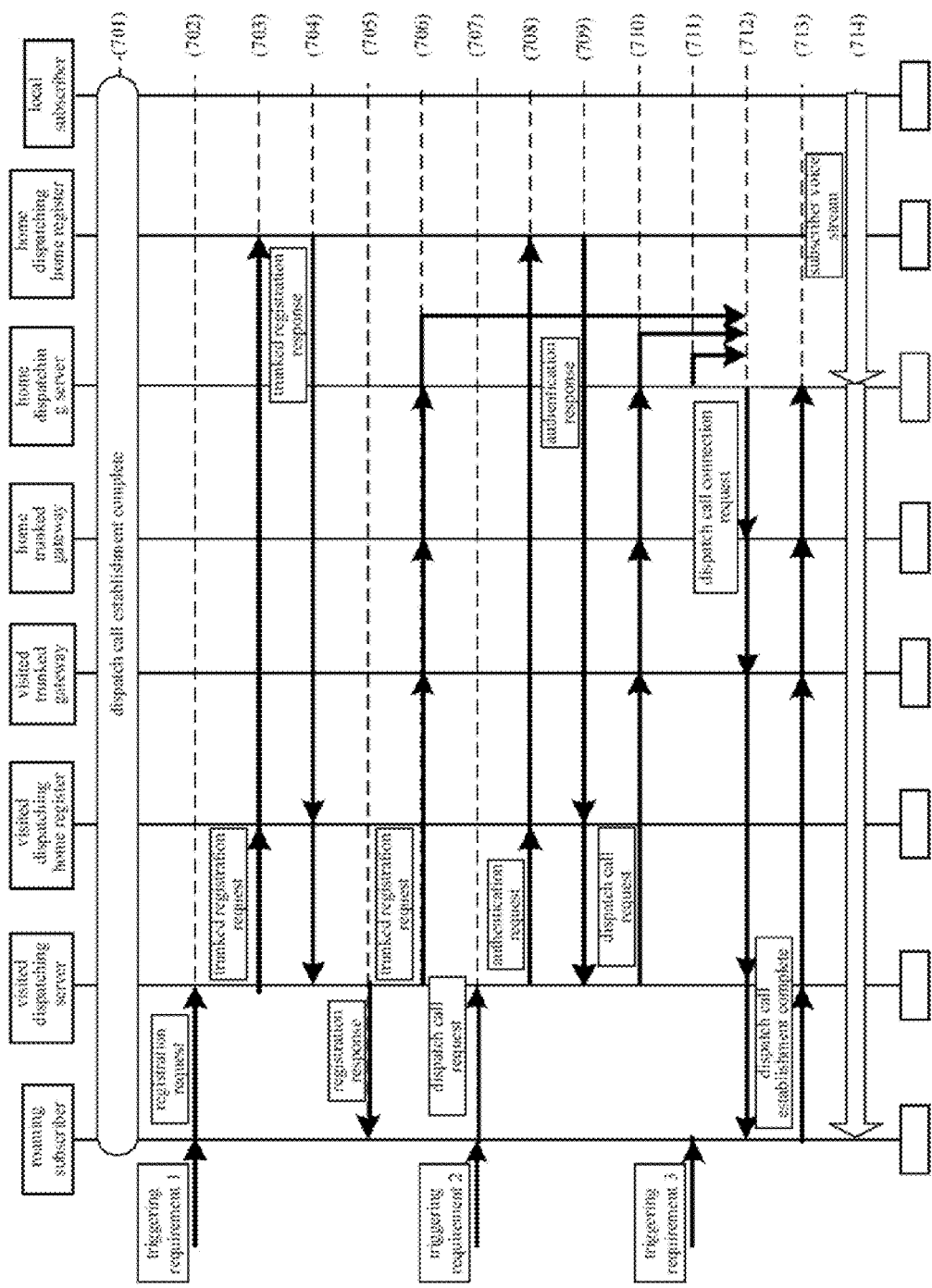
FIG. 7 is a flow view illustrating that the roaming subscriber late-joins in the dispatch call in the method of the present invention.

FIG. 7 is a detailed flow view illustrating the roaming subscriber late-joins in the dispatch call. Firstly, the dispatch call has been established, but the roaming subscriber fails to join in the call when the call is established due to power off or invalid location information (step 701).

The requirement for triggering the roaming subscriber to enter the procedure of late-joining is that the roaming subscriber originates the registration request for the trunked service (step 702). The visited dispatching server sends the trunked registration request to the visited dispatching home register after receiving the registered request. The visited dispatching home register selects route according to the subscriber identification code, and forwards the registration request to the home dispatching home register (step 703). The home dispatching home register renews the location of the subscriber according to the trunked registration request message, and returns the trunked registration response message to the visited dispatching home register, wherein the home dispatching home register determines the dispatch call of the roaming subscriber has been established but the subscriber has not joined in the call, and the trunked registration response message carries an indication that the dispatch call has been established therein; the visited dispatching home register returns the registration response message to the visited dispatching server (step 704). Then the visited dispatching server returns the registration response message of the trunked service to the roaming subscriber (step 705). The visited dispatching server determines that the roaming subscriber belongs to a certain activated dispatch call according to the indication in the registration response message which indicates that the dispatch call has been established, conducts routing according to the subscriber identification code, and forwards the registration request to the home dispatching server. The home dispatching server receives the registration request, and then determines that the dispatch call has been established, while the subscriber has not joined in the call (step 706). Then the procedure jumps to step 712.

The requirement for triggering the roaming subscriber to enter the procedure of late-joining is that the roaming subscriber originates the dispatch call actively (step 707). The visited dispatching server receives the call request, and then sends the authentication request to the visited dispatching home register; the visited dispatching home register selects route according to the subscriber identification code, and forwards the authentication request to the home dispatching home register (step 708). The home dispatching home register authenticates and authorizes the subscriber, and returns the authentication response to the visited dispatching home register, the visited dispatching home register returns the authentication response to the visited dispatching server (step 709). The visited dispatching server receives the authentication response, then determines that the subscriber is a roaming subscriber, and thus forwards the dispatch call request to the visited trunked gateway according to the subscriber home information returned by the authentication response; the visited trunked gateway translates the call request into the form of external signaling, and routes the signaling to the home trunked gateway; the home trunked gateway then translates the external signaling into the dispatch call request message, and forwards the message to the home dispatching server. After receiving the call request, the home dispatching server may conduct a second authentication to the call request, and this authentication can also be omitted. After receiving the call request, the home dispatching server determines that the call has been established, while the subscriber has not joined in the call (step 710). Then the procedure jumps to step 712.

The requirement for triggering the roaming subscriber to enter the procedure of late-joining is that the home dispatching subsystem sends the trunked connection request to the roaming subscriber actively. The time for the active sending may be once or periodical (step 711). Then the procedure jumps to the step 712.

The home dispatching server sends the dispatch call connection request to the home trunked gateway, the home trunked gateway translates the request into the form of external signaling after receiving it, and routes the signaling to the visited trunked gateway; the visited trunked gateway then translates the external signaling into the trunked connection request message, and forwards the message to the visited dispatching server; the visited dispatching server sends the dispatch call connection request to the roaming subscriber (step 712). The roaming subscriber returns the dispatch call establishment message to the home dispatching server after the channel has been established; and the roaming subscriber late-joins in the call (step 713).

If other subscribers are talking in the call at the time, the home dispatching server forwards the voice stream to the roaming subscriber, and the voice stream message is sent to the roaming subscriber via the home trunked gateway, the visited trunked gateway, and the visited dispatching server; if the call is in a state that nobody talks, and the call which late-joins in the dispatch call is triggered by triggering requirement 2, the home dispatching server sends the dispatch call authorization to the calling subscriber via the visited dispatching server and the visited base station subsystem (step 714).

In the above described roaming method, the dispatch call includes one-to-one call and one-to-many call.

Above all, the present invention can provide the subscriber with the roaming support for all kinds of services within the whole network range.

Finally, it should be understood that the above embodiments are used to illustrate the technical solution of the present invention and should not be construed as a limit thereto. Although the invention is illustrated in detail with reference to preferred embodiments, those of ordinary skill in the art should know that various modifications or equivalents can be done to the technical solution of the invention without departing from the spirit and range thereof and should be included in the claims of the present invention.

What is claimed is:

1. A roaming method for a digital trunked communication network, comprising:
    originating, by a roaming subscriber, a dispatch call request;
    conducting, by a visited dispatching subsystem serving the roaming subscriber, routing according to subscriber identification code information of the roaming subscriber;
    sending, by the visited dispatching subsystem, an authentication request to a home dispatching subsystem of the roaming subscriber;
    authenticating, by the home dispatching subsystem, the roaming subscriber;
    forwarding, by the visited dispatching subsystem, the dispatch call request to the home dispatching subsystem;
    originating, by the home dispatching subsystem, a trunked connection request to one or more subscribers to be involved in the dispatch call;
    receiving, by the home dispatching subsystem, a call establishment completion notification upon the dispatch call being established; and
    sending, by the home dispatching subsystem, a dispatch call authorization to the one or more subscribers.

2. The roaming method for the digital trunked communication network according to claim 1, wherein the visited dispatching subsystem comprises a visited dispatching server, a visited dispatching home register and a visited trunked gateway, and the home dispatching subsystem comprises a home dispatching server, a home dispatching home register and a home trunked gateway, the method comprising:
    sending, by the roaming subscriber, the dispatch call request to the visited dispatching server;
    sending, by the visited dispatching server, an authentication request to the visited dispatching home register;
    selecting, by the visited dispatching home register, a route according to the subscriber identification code information;
    forwarding, by the visited dispatching home register, the authentication request to the home dispatching home register;
    authenticating and authorizing, by the home dispatching home register, the roaming subscriber;
    returning, by the home dispatching home register, an authentication response to the visited dispatching home register;
    returning, by the visited dispatching home register, the authentication response to the visited dispatching server;
    forwarding, by the visited dispatching server, the dispatch call request to the visited trunked gateway according to subscriber's home information returned via the authentication response;
    translating, by the visited trunked gateway, the received dispatch call request into a form of external signaling;
    routing, by the visited trunked gateway, the external signaling to the home trunked gateway;
    translating, by the home trunked gateway, the external signaling into the dispatch call request,
    forwarding, by the home trunked gateway, the dispatch call request to the home dispatching server;
    sending, by the home dispatching server, the trunked connection request to the home trunked gateway if the subscriber is a roaming subscriber;
    translating, by the home trunked gateway, the trunked connection request into the form of external signaling;
    routing, by the home trunked gateway, the external signaling to the visited trunked gateway;
    translating, by the visited trunked gateway, the external signaling into the trunked connection request;
    forwarding, by the visited trunked gateway, the trunked connection request to the visited dispatching server;
    sending, by the visited dispatching server, the trunked connection request to the roaming subscriber;
    returning, by the roaming subscriber, a dispatch call establishment message to the home dispatching server after a channel is established;
    sending, by the home dispatching server, a talk floor authorization message to the home trunked gateway after receiving the dispatch call establishment message;
    translating, by the home trunked gateway, the talk floor authorization message into the form of external signaling;
    routing, by the home trunked gateway, the external signaling to the visited trunked gateway;
    translating, by the visited trunked gateway, the external signaling into the talk floor authorization message;
    forwarding, by the visited trunked gateway, the talk floor authorization message to the visited dispatching server;
    sending, by the visited dispatching server, the talk floor authorization message to the roaming subscriber;
    beginning, by the roaming subscriber, a talk upon a call prompt being received;
    sending a voice stream message of the roaming subscriber to the home dispatching server via the visited dispatching server, the visited trunked gateway, and the home trunked gateway, and
    distributing, by the home dispatching server, the voice stream message to other subscribers of the dispatch call.

3. The roaming method for the digital trunked communication network of claim 2, wherein
    authenticating, by the home dispatching server, the roaming subscriber again after receiving the dispatch call request;
    returning, by the home dispatching home register, the authentication response to the home dispatching server after authenticating and authorizing the roaming subscriber.

4. The roaming method for the digital trunked communication network according to claim 2, further comprising:
    when the roaming subscriber finishes talking,
    sending, by the roaming subscriber, a talk floor release message to the visited dispatching server;

forwarding, by the visited dispatching server, the talk floor release message to the visited trunked gateway;

translating, by the visited trunked gateway, the talk floor release message to the form of external signaling;

routing, by the visited trunked gateway, the external signaling to the home trunked gateway;

translating, by the home trunked gateway, the external signaling to the talk floor release message;

forwarding, by the home trunked gateway, the talk floor release message to the home dispatching server; and the talk floor entering an idle state.

5. The roaming method for the digital trunked communication network according to claim 4, further comprising:

when a subscriber who has the authority to end a call ends the dispatch call, or an idle duration of the dispatch call is time-out, determining, by the home dispatching server, if the subscriber ending the dispatch call is a roaming subscriber or a local subscriber, if the subscriber ending the dispatch call is a roaming subscriber:

sending, by the home dispatching server, a dispatch call release message to the home trunked gateway;

translating, by the home trunked gateway, the dispatch call release message into the form of external signaling;

routing, by the home trunked gateway, the external signaling to the visited trunked gateway;

translating, by the visited trunked gateway, the external signaling into the dispatch call release message;

forwarding, by the visited trunked gateway, the dispatch call release message to the visited dispatching server;

sending, by the visited dispatching server, the dispatch call release message to the roaming subscriber; and if the subscriber ending the dispatch call is a local subscriber, sending, by the home dispatching server, the dispatch call release message to the local subscriber directly;

returning a dispatch call release completion message to the home dispatching server, after the dispatch call of the subscriber has been released.

6. A roaming method for a digital trunked communication network, comprising:

originating, by a calling subscriber, a dispatch call;

originating, by a home dispatching subsystem of the calling subscriber, a trunked connection request to one or more called subscribers;

if at least one of the one or more called subscribers is a roaming subscriber, forwarding, by the home dispatching subsystem, the trunked connection request to a visited dispatching subsystem serving the roaming subscriber;

receiving, by the home dispatching subsystem, a call establishment completion notification upon the call being established; and sending, by the home dispatching subsystem, a dispatch call authorization to the calling subscriber.

7. The roaming method for the digital trunked communication network of claim 6, wherein the visited dispatching subsystem comprises a visited dispatching server, a visited dispatching home register and a visited trunked gateway, and the home dispatching subsystem comprises a home dispatching server, a home dispatching home register and a home trunked gateway, the method further comprising:

originating, by the called subscriber, a dispatch call request to the home dispatching server;

sending, by the home dispatching server, an authentication request to the home dispatching home register;

authenticating and authorizing, by the home dispatching home register, the calling subscriber;

returning, by the home dispatching home register, an authentication response to the home dispatching server;

determining, by the home dispatching server, if the called subscriber is a roaming subscriber or a local subscriber;

if the called subscriber is a roaming subscriber, sending, by the home dispatching server, the trunked connection request to the home trunked gateway;

translating, by the home trunked gateway, the trunked connection request into the form of external signaling;

routing, by the home trunked gateway, the external signaling to the visited trunked gateway;

translating, by the visited trunked gateway, the external signaling into the trunked connection request;

forwarding, by the visited trunked gateway, the trunked connection request to the visited dispatching server;

sending, by the visited dispatching server, the trunked connection request to the roaming subscriber;

if the called subscriber is a local subscriber, sending, by the home dispatching server, the trunked connection request to the local subscriber directly;

returning, by the called subscriber, a dispatch call establishment message to the home dispatching server after a channel has been established;

sending, by the home dispatching server, a talk floor authorization message to the calling subscriber after knowing that the dispatch call has been established;

beginning, by the calling subscriber, a talk upon the call prompt being received;

sending the voice stream message of the calling subscriber to the home dispatching server;

distributing, by the home dispatching server, the voice stream message to the called subscribers of the dispatch call, wherein, if the called subscriber is a roaming subscriber, sending the voice stream message to the roaming subscriber via the home trunked gateway, the visited trunked gateway, and the visited dispatching server.

8. The roaming method for the digital trunked communication network of claim 7, further comprising:

sending a talk floor release message to the home dispatching server when the calling subscriber finishes talking; and the talk floor entering an idle state.

9. The roaming method for the digital trunked communication network of claim 8, further comprising:

when a subscriber who has the authority to end a call ends the dispatch call, or the idle duration of the dispatch call is time-out, determining, by the home dispatching server, if the subscriber ending the dispatch call is a roaming subscriber or a local subscriber, if the subscriber ending the dispatch call is a roaming subscriber, sending the dispatch call release message to the home trunked gateway;

translating, by the home trunked gateway, the call release message into the form of external signaling;

routing, by the home trunked gateway, the external signaling to the visited trunked gateway;

translating, by the visited trunked gateway, the external signaling into the dispatch call release message;

forwarding, by the visited trunked gateway, the dispatch call release message to the visited dispatching server;

sending, by the visited dispatching server, the dispatch call release message to the roaming subscriber, and if the subscriber ending the dispatch call is a local subscriber, sending the dispatch call release message to the local subscriber directly;

returning a dispatch call release completion message to the home dispatching server, after the dispatch call has been released.

10. A roaming method for the digital trunked communication network, comprising:

after a dispatch call has been established, originating, by a roaming subscriber, a registration request;

forwarding, by a visited dispatching subsystem serving the roaming subscriber, the registration request to a home dispatching subsystem of the roaming subscriber;

originating, by the home dispatching subsystem, a trunked connection request for the roaming subscriber to the visited dispatching subsystem when the home dispatching subsystem determines the dispatch call has been established while the roaming subscriber has not yet joined in the call;

receiving, by the home dispatching subsystem, a call establishment completion notification when the call of the roaming subscriber is established; and adding, by the home dispatching subsystem, the roaming subscriber to the dispatch call.

11. The roaming method for the digital trunked communication network of claim 10, comprising:

before the home dispatching subsystem originates the trunked connection request for the roaming subscriber, originating, by the roaming subscriber, a dispatch call request; and forwarding, by the visited dispatching subsystem, the dispatch call request to the home dispatching subsystem.

12. The roaming method for the digital trunked communication network of claim 10, wherein the visited dispatching subsystem comprises a visited dispatching server, a visited dispatching home register and a visited trunked gateway, and the home dispatching subsystem comprises a home dispatching server, a home dispatching home register and a home trunked gateway, the method comprising:

originating, by a roaming subscriber, a registration request to the visited dispatching server;

sending, by a visited dispatching server, the registration request to the visited dispatching home register;

selecting, by the visited dispatching home register, a route according to the subscriber identification code information;

sending, by the visited dispatching home register, the registration request to the home dispatching home register;

renewing, by the home dispatching home register, the location of the roaming subscriber according to the registration request;

returning, by the home dispatching home register, a registration response to the visited dispatching home register, wherein the response message carries an indication that the dispatch call has been established;

returning, by the visited dispatching home register, the registration response to the visited dispatching server;

returning, by the visited dispatching server, the registration response to the roaming subscriber;

determining, by the visited dispatching server, that the roaming subscriber belongs to a certain activated dispatch call according to the indication in the registration response, conducting, by the visited dispatching server, routing according to subscriber identification code information;

forwarding, by the visited dispatching server, the registration request to the home dispatching server;

receiving, by the home dispatching server, the registration request;

determining, by the home dispatching server, that the dispatch call has been established while the subscriber has not joined in the call;

sending, by the home dispatching server, the trunked connection request to the home trunked gateway;

translating, by the home trunked gateway, the trunked connection request into the form of external signaling;

routing, by the home trunked gateway, the external signaling to the visited trunked gateway;

translating, by the visited trunked gateway, the external signaling into the trunked connection request;

forwarding, by the visited trunked gateway, the trunked connection request to the visited dispatching server;

sending, by the visited dispatching server, the trunked connection request to the roaming subscriber;

returning, by the roaming subscriber, a dispatch call establishment message to the home dispatching server after a channel has been established; and joining, by the roaming subscriber, in the dispatch call.

13. The roaming method for the digital trunked communication network of claim 11, wherein the visited dispatching subsystem comprises a visited dispatching server, a visited dispatching home register and a visited trunked gateway, and the home dispatching subsystem comprises a home dispatching server, a home dispatching home register and a home trunked gateway, the method comprising:

originating, by the roaming subscriber, a dispatch call request to the visited dispatching server;

sending, by the visited dispatching server, the authentication request to the visited dispatching home register;

selecting, by the visited dispatching home register, a route according to subscriber identification code information;

forwarding, by visited dispatching home register, the authentication request to a home dispatching home register;

authenticating and authorizing, by the home dispatching home register, the roaming subscriber;

returning, by the home dispatching home register, an authentication response to the visited dispatching home register;

returning, by the visited dispatching home register, the authentication response to the visited dispatching server;

forwarding, by the visited dispatching server, the dispatch call request to the visited trunked gateway according to the subscriber's home information returned by the authentication response;

translating, by the visited trunked gateway, the dispatch call request into the form of external signaling;

routing, by the visited trunked gateway, the external signaling to a home trunked gateway;

translating, by the home trunked gateway, the external signaling into the dispatch call request;

forwarding, by the home trunked gateway, the dispatch call request to the home dispatching server;

determining, by the home dispatching server, that the call has been established, while the subscriber has not joined in the call;

sending, by the home dispatching server, the trunked connection request to the home trunked gateway;

translating, by the home trunked gateway, the trunked connection request into the form of external signaling;

routing, by the home trunked gateway, the external signaling to the visited trunked gateway;

translating, by the visited trunked gateway, the external signaling into the trunked connection request;

forwarding, by the visited trunked gateway, the trunked connection request to the visited dispatching server;

sending, by the visited dispatching server, the trunked connection request to the roaming subscriber;

returning, by the roaming subscriber, a dispatch call establishment message to the home dispatching server after a channel has been established; and joining, by the roaming subscriber, in the call.

14. The roaming method for the digital trunked communication network of claim 13, wherein the home dispatching server authenticates the roaming subscriber again after receiving the dispatch call request; and the home dispatching home register returns the authentication response to the home dispatching server after authenticating and authorizing the roaming subscriber.

15. The roaming method for the digital trunked communication network according to claim 13, further comprising:

if the dispatch call is in a state in which nobody talks, sending, by the home dispatching server, a dispatch call authorization to the calling subscriber via the visited dispatching server and a visited base station subsystem.

16. The roaming method for the digital trunked communication network of claim 10, wherein the visited dispatching subsystem comprises a visited dispatching server and a visited trunked gateway, and the home dispatching subsystem comprises a home dispatching server and a home trunked gateway, the method comprising::

sending, by the home dispatching server, the trunked connection request to the home trunked gateway;

translating, by the home trunked gateway, the trunked connection request into the form of external signaling;

routing, by the home trunked gateway, the external signaling to the visited trunked gateway;

translating, by the visited trunked gateway, the external signaling into the trunked connection request;

forwarding, by the visited trunked gateway, the trunked connection request to the visited dispatching server;

sending, by the visited dispatching server, the trunked connection request to the roaming subscriber who has not joined in the call;

returning, by the roaming subscriber, the dispatch call establishment message to the home dispatching server after a channel has been established; and joining, by the roaming subscriber, in the call.

17. The roaming method for the digital trunked communication network of claim 16, wherein the home dispatching subsystem sends the trunked connection request once or periodically.

18. A digital trunked communication network supporting roaming, comprising:

at least two trunked communication systems, and each of the trunked communication systems comprises a base station subsystem and a dispatching subsystem, wherein the dispatching subsystems of different trunked communication systems are connected via an external network;

wherein the base station subsystem is adapted to access various services of a terminal and to forward a trunked service to the dispatching subsystem; and the dispatching subsystem is adapted to control and manage the trunked service of the terminals in the service area thereof, wherein the dispatching subsystem comprises: a dispatching server, a dispatching home register, and a trunked gateway; wherein the dispatching server is adapted to control a dispatch call and manage a talk floor of the dispatch call;

the dispatching home register is adapted to store registration information and location information of a trunked subscriber and/or a group of trunked subscribers; and the trunked gateway is adapted to connect the external network.

19. The digital trunked communication network supporting roaming of claim 18, wherein, the trunked gateway is divided into a trunked signaling gateway and a trunked media gateway, wherein the trunked signaling gateway is responsible for interacting and converting a signaling as well as controlling the trunked media gateway; and the trunked media gateway is responsible for converting and transmitting a media stream.

20. The digital trunked communication network supporting roaming of claim 19, wherein, the peripheral interface of the trunked gateway uses a format which is consistent with the inner signaling and the media stream of the trunked system.

21. The digital trunked communication network which supports roaming of claim 19, wherein the peripheral interface of the trunked gateway uses SIP/RTP interface in the NGN network.

22. The digital trunked communication network supporting roaming of claim 18, wherein if the dispatching home registers in the two trunked communication systems cannot communicate with each other directly, messages will be forwarded by an agent dispatching home register in an intermediate trunked communication system.

23. The digital trunked communication network supporting roaming of claim 18, wherein if the trunked gateways in the two trunked communication systems cannot communicate with each other directly, messages will be forwarded by an agent trunked gateway in an intermediate trunked communication system.

24. The digital trunked communication network supporting roaming of claim 18, further comprising:

an exchange subsystem, and/or a packet data subsystem, and/or a short message subsystem, and/or an intelligent network subsystem, and/or a positioning subsystem to achieve other services for the terminals.

* * * * *